United States Patent [19]

Judy

[11] Patent Number: 5,782,115
[45] Date of Patent: Jul. 21, 1998

[54] ANTI-THEFT SECURITY DEVICE FOR TRAILERS OF TRUCKS

[76] Inventor: Danny Lee Judy, 2635 Sunset Ave., Springfield, Ohio 45505

[21] Appl. No.: 660,707

[22] Filed: Jun. 6, 1996

[51] Int. Cl.⁶ .................................................. B60R 25/00
[52] U.S. Cl. ................... 70/164; 70/203; 70/212; 70/237; 70/258; 248/552; 280/475
[58] Field of Search ................ 70/212, 258, 237, 70/14, 18, 202, 203, 164, 235, 232; 248/552; 280/507, 475, 763.1

[56] References Cited

U.S. PATENT DOCUMENTS

| | | | |
|---|---|---|---|
| 1,026,189 | 5/1912 | Wheeler | 70/212 |
| 1,239,292 | 9/1917 | Mundell | 70/237 |
| 1,341,055 | 5/1920 | Harvey | 70/212 |
| 1,358,681 | 11/1920 | Parker | 70/212 |
| 1,361,264 | 12/1920 | Kaercher | 70/212 |
| 1,498,772 | 6/1924 | Anderson | 70/212 |
| 1,588,421 | 6/1926 | Holland | 70/212 |
| 3,287,943 | 11/1966 | Vaughn et al. | 70/232 |
| 4,008,589 | 2/1977 | Harrell | 70/237 X |
| 4,304,111 | 12/1981 | Nolin | 70/212 |
| 4,473,176 | 9/1984 | Harper | 248/552 X |
| 5,426,961 | 6/1995 | Rimbaud et al. | 70/258 X |
| 5,520,030 | 5/1996 | Muldoon | 70/258 X |

FOREIGN PATENT DOCUMENTS

| | | | |
|---|---|---|---|
| 902011 | 6/1972 | Canada | 70/212 |
| 0022102 | 1/1981 | European Pat. Off. | 70/232 |
| 533814 | 12/1921 | France | 70/212 |
| 2458410 | 2/1981 | France | 280/507 |
| 61262 | 3/1935 | Germany | 70/212 |
| 2188893 | 10/1987 | United Kingdom | 70/237 |
| 2255538 | 11/1992 | United Kingdom | 280/507 |

*Primary Examiner*—Lloyd A. Gall
*Attorney, Agent, or Firm*—Kremblas, Foster, Millard & Pollick

[57] ABSTRACT

An anti-theft device is provided for use with semi-trailers of the type which have a Dolly-Leg, a Dolly-Leg crank, and a Dolly-Leg crank handle. The anti-theft device includes a housing, a locking bar, and a lock. The housing has a top, an end panel, a first side, a second side, and a notched bottom, with the first side and the second side each having formed therein a first side aperture and a second side aperture respectively. The notched bottom has downwardly depending therefrom at least two lock chain guide harnesses. The locking bar has formed therein at one end thereof a locking bar aperture. The locking bar extends through both the first side and the second side of the housing, such that the locking bar passes through both the first side aperture as well as the second side aperture. The lock is secured to the locking bar by attachment thereto through the locking bar aperture. The device also preferably includes a chain, with the chain also being secured to the locking bar.

15 Claims, 3 Drawing Sheets

5,782,115

ANTI-THEFT SECURITY DEVICE FOR TRAILERS OF TRUCKS

FIELD OF THE INVENTION

This invention relates to Anti-Theft Devices, and more particularly to those which are used to prevent the unauthorized use or theft of semi-trailers in the trucking industry.

BACKGROUND OF THE INVENTION

Originally, in order to prevent the theft or unauthorized use of semi-trailers, the trailer had to be kept hooked up to its tractor or locked up in some type of fence-secured compound. Given the adverse monetary consequences associated with the theft of a trailer, attempts have been made to solve the problem. For example, one inventor created an enclosure/metal cap that was locked over the trailer's fifth-wheel pin in order to prevent anyone from hooking up to the trailer when it was parked.

Although this type of device would prevent anyone from hooking up to a trailer and driving off, without first taking the cap off, there are many draw-backs to this invention. First, it is not able to be installed easily and quickly because of where the fifth-wheel pin cap is located on a trailer. Second, a problem existed because some drivers would fail to see that a locked cap was installed on a trailer and try to back under it anyway. Then, recognizing that the trailer was not coupled to the tractor, the driver would conclude that more power was needed in the backing operation. Consequently, when the driver pulled forward and backed up again with more power sometimes causing the fifth-wheel pin to get sheared off, which of course would cause major damage to the trailer. Third, a problem existed because after these locked-caps were not in use, they were hard to store because of all the grease from the fifth-wheel pin.

SUMMARY OF THE INVENTION

In accordance with this invention an anti-theft device for use with semi-trailers is provided. The structure of this invention is formed of steel and includes a housing, with the housing having a top, an end panel, a first side, a second side, and a notched bottom, with the first side and the second side each having formed therein a first side aperture and a second side aperture respectively. In addition to the housing, the invention also includes a locking bar and a lock. The locking bar has formed therein at one end thereof a locking bar aperture. Further, the lock is secured to the locking bar by attachment thereto through the locking bar aperture. In the preferred embodiment of the invention the device also includes a chain, with the chain being secured to the housing. Preferably, the chain is a hardened metal chain of five feet in length.

The locking bar extends through both the first side and the second side of the housing, such that the locking bar passes through both the first side aperture and the second side aperture. In addition, the locking bar is retained in the housing by the passing of the lock through the locking bar aperture. The notched bottom has downwardly depending therefrom at least two lock chain guide harnesses. Also, the chain is also secured to said locking bar by said lock.

There is also disclosed an anti-device for use with semi-trailers of the type which have a dolly-leg, a dolly-leg crank, and a dolly-leg crank handle, with the anti-theft device including a housing, with the housing having a top, an end panel, a first side, a second side, a notched bottom, and with the first side and the second side each having formed therein a first side aperture and a second side aperture respectively. Downwardly depending from the bottom are at least two lock chain guide harnesses. In addition to the housing, the invention includes a locking bar and a lock, with the locking bar having formed therein at one end thereof a locking bar aperture. In the preferred embodiment of the invention there is also a chain, with the chain having a section thereof secured to the housing.

Once again, preferably the chain is a hardened metal chain of five feet in length. Furthermore, in the preferred embodiment of the invention the chain is also secured to the locking bar by the lock. Additionally, the locking bar extends through both the first side and the second side of the housing, with the locking bar passing through both the first side aperture and the second side aperture. The locking bar is retained in the housing by the passing of the lock through the locking bar aperture.

There is also disclosed a method for preventing the theft of a semi-trailer having a dolly-leg, a dolly-leg crank, and a dolly-leg crank handle, comprising the steps of: (1) placing a housing, open at the end adjacent the semi-trailer, and having a notched bottom, over the dolly-leg crank handle; (2) sliding a locking bar through apertures in the side walls of the housing, such that the locking bar is perpendicular to the portion of the crank handle covered by the housing, and such that the downwardly disposed portion of the crank handle is located within the notched portion of the bottom of the housing between the locking bar and the closed end of the notch; and (3) securing the locking bar in place adjacent the housing. In accordance with this method there is an additional of passing a chain secured to the housing through at least two downwardly depending lock chain guide harnesses, then around the dolly-leg, and then to the locking bar where it is secured to the locking bar.

The primary objective of this invention is to provide an anti-theft device which prevents the theft or unauthorized use of semi-trailers. Another object of the invention is to provide a device capable of quickly and easily being installed. Yet another object of the invention is to provide a semi-trailer anti-theft device with a relatively low cost factor. Still another object of the invention is to provide a device capable of quickly and easily being removed by the authorized driver. Finally, an important object of the invention is to provide an anti-theft device made such that it would not damage the dolly legs on the trailers when it was removed.

These and other objects and advantages of this invention will be readily apparent from the following detailed description of an illustrative embodiment thereof. Reference will be had to the accompanying drawings which illustrate the embodiment of the invention.

DETAILED DESCRIPTION OF THE INVENTION

Figure 1:
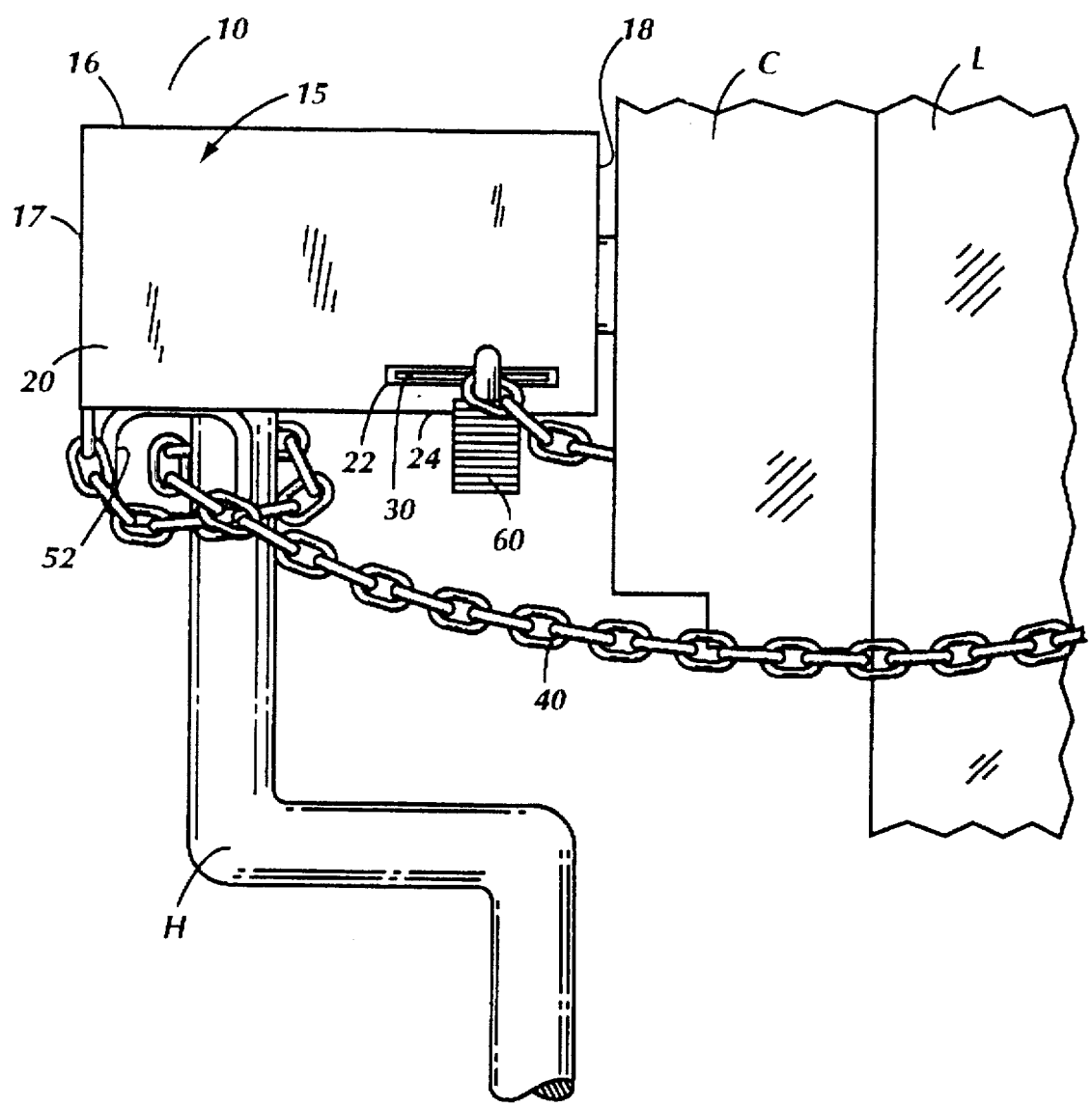
FIG. 1 is a side view of an anti-theft device in use, which device is made in accordance with the present invention.
Figure 2:
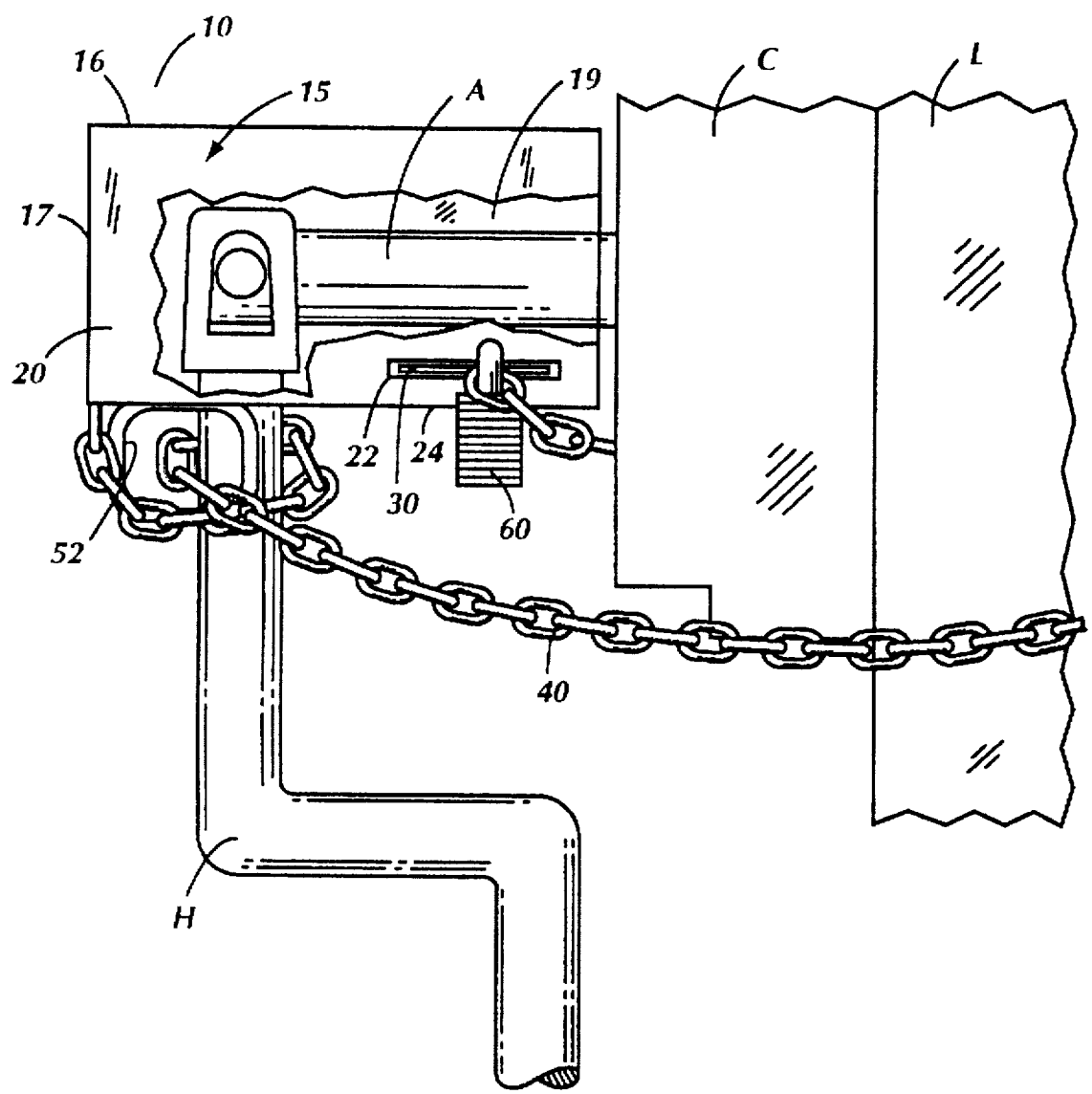
FIG. 2 is a side view similar to FIG. 1, but shown partially exploded.
Figure 3:
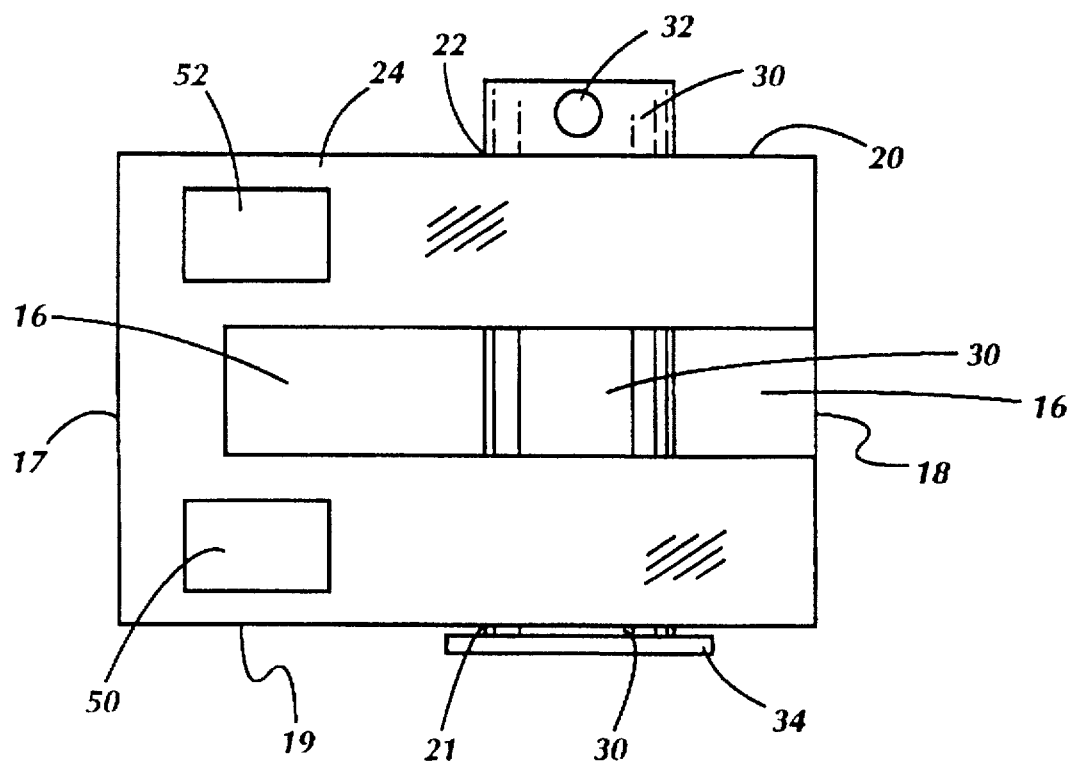
FIG. 3 is a bottom elevational view of the device by itself with the locking bar in its operative position.

Having reference to the drawings, attention is directed to FIG. 1 which shows the anti-theft device of this invention in its operative position on a semi-trailer, with the device being designated generally by the numeral 10. Comparing FIGS. 1, 2, and 3 it will be appreciated that the device 10 includes a housing 15, with the housing 15 having a top surface 16, a closed or capped end 17, an open end 18 opposite the capped end 17, a first side 19 and a second side 20. The housing is made of ⅛ inch flat-boxed tubular steel. It will be appreciated that the housing is elongated in shape. The dimensions are as follows: the length of the housing is 7"; the width of the housing is 5"; and the heighth of the housing is 3". As stated above, the housing is open at one end and has a 5" by 3" steel cap which is welded on the other end to form the closed end.

Furthermore, the first side 19 features a slotted first side aperture 21, while the second side 20 features a slotted second side aperture 22. In the preferred embodiment of the invention, each is 2¼"×½". The housing also has a notched bottom 24, with the notch extending from the open end 18 along the longitudinal center line, and with the cut out portion being 6" by 1⅛".

The device 10 also comprises a locking bar 30, with the locking bar 30 having a locking bar aperture 32 and a locking bar plate 34. The lock bar is made of ⅛" flat steel. The locking bar 30 is elongated in shape and is 7" long and 2" wide. The locking bar plate 34 is preferably welded onto the locking bar such that it is perpendicular thereto. It is desirable that the locking bar plate be 2" long, ¾" wide, and ⅛" thick. The locking bar aperture 32 is near one end of the locking bar 30, and more particularly it is located such that when the locking bar 30 is inserted into the first side aperture 21 and pushed until it exits from the second side aperture 22, the locking bar aperture is located outside the housing 15. The locking bar aperture should be at least ⅛" in diameter, such that a lock will pass therethrough. Meanwhile, the locking bar plate 34 is secured to the opposite end of the locking bar 30, and precludes the locking bar from passing completely through the first side aperture 21.

In the preferred embodiment of the invention, a chain 40 is included as part of the anti-theft device 10. The chain is preferably a 5" long, 5/16 wide link, hardened steel chain. One end of the chain is secured to the housing 15 preferably along the notched bottom 24. The preferred method of securing is by welding. Depending downwardly from the notched bottom 24 are at least two lock chain guide harnesses 50 and 52. Both are attached to the bottom near the capped end 17, preferably by welding. Each of the lock chain harnesses are fabricated from two pieces of "u-shaped" steel. In the preferred embodiment of the invention they are ⅛" thick, 2" tall, 2" long×3/16" wide.

There is also a lock 60 which serves to prevent the locking bar 30 from being easily removed from the housing 15 by withdrawal through the first and second side apertures, 21 and 22 respectively. In the preferred embodiment of the invention the lock is a MASTER-LOCK, New Pro Series, No. 6300. This lock is fabricated from an alloy which provides up to 15,000 lbs of resistance to cutting or sawing of its shackle.

In actual use the anti-theft device 10 is used on semi-trailers having a dolly-leg L, a dolly-leg crank C, a dolly-leg crank arm A, and a dolly-leg crank handle H. The housing 15 is slipped over the portion of the dolly-leg crank handle H, which in its rest position is downwardly depending. Once the housing is placed over the crank handle H, the locking bar is slid through the housing and locked in place by the lock which is placed through the locking plate aperture. This prevents the removal of the locking plate from the housing. The chain 40 may then be made to pass through the lock chain guide harnesses 50 and 52. It then is preferably wrapped around the crank handle H and the trailer's dolly-leg L.

The anti-theft device of this invention prevents the raising or lowering of the trailer's dolly-legs, which in turn prevents theft or any unwanted use. This is accomplished by the locking of the crank handle H in place such that it can not turn the dolly-leg crank C. It is physically restrained from being able to crank. Only when the housing is removed can the crank raise or lower the dolly-legs of the trailer.

It will be readily apparent, from the foregoing detailed description of the invention, that a particularly novel and extremely effective anti-theft device is provided for use particularly with semi-trailers having a prop or dolly leg. The device serves as an anti-theft deterrent by preventing unwanted persons from moving semi-trailers from place to place without consent to do. This device effectively stops the aforesaid actions by temporarily immobilizing the dolly legs of a trailer so they cannot be raised or lowered. This device of this invention has a relatively low cost, yet is still effective. This device can be installed, as well as removed, easily and quickly by an authorized individual. Furthermore, it does not damage the trailer's dolly legs after its use, and there is little or no maintenance cost. Finally, due to the dimensions of the various component parts, the device can be easily stored in a compact area when not in use.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An anti-theft device for use with semi-trailers of the type which have a dolly-leg, a dolly-leg crank, and a dolly-leg crank handle, said anti-theft device comprising a housing, said housing having a top, an end panel, a first side, a second side, a notched bottom, said first side and said second side each having formed therein a first side aperture and a second side aperture respectively, said notched bottom having downwardly depending therefrom at least two lock chain guide harnesses, a locking bar, said locking bar having formed therein at one end thereof a locking bar aperture, a lock, said lock being secured to said locking bar by attachment thereto through said locking bar apertures, and a chain, said chain being secured to said housing.

2. The anti-theft device according to claim 1 wherein said chain is a hardened metal chain of five feet in length.

3. The anti-theft device according to claim 1 wherein said chain is also secured to said locking bar by said lock.

4. The anti-theft device according to claim 1 wherein said locking bar extends through both said first side and said second side of said housing, said locking bar passing through both said first side aperture and said second side aperture.

5. The anti-theft device according to claim 4 wherein said locking bar is retained in said housing by the passing of said lock through said locking bar aperture.

6. An anti-theft device for use with semi-trailers of the type which have a dolly-leg, a dolly-leg crank, and a dolly-leg crank handle, said anti-theft device comprising a housing, said housing having a top, an end panel, a first side, a second side, a notched bottom, said first side and said second side each having formed therein a first side aperture and a second side aperture respectively, said bottom having downwardly depending therefrom at least two lock chain guide harnesses, a locking bar, said locking bar having formed therein at one end thereof a locking bar aperture, a lock, and a chain, said chain having a section thereof secured to said housing.

7. The anti-theft device according to claim 6 wherein said chain is a hardened metal chain of five feet in length.

8. The anti-theft device according to claim 6 wherein said chain is also secured to said locking bar by said lock.

9. The anti-theft device according to claim 6 wherein said locking bar extends through both said first side and said second side of said housing, said locking bar passing through both said first side aperture and said second side aperture.

10. The anti-theft device according to claim 9 wherein said locking bar is retained in said housing by the passing of said lock through said locking bar aperture.

11. A method for preventing the theft of a semi-trailer having a dolly-leg, a dolly-leg crank, and a dolly-leg crank handle, comprising the steps of:

placing a housing, open at an end adjacent the semi-trailer and closed at an opposite end, and having a notched bottom, and side walls over the dolly-leg crank handle, such that a portion of said dolly-leg crank handle is downwardly disposed, sliding a locking bar through apertures in the side walls of the housing, such that the locking bar is perpendicular to the portion of the crank handle covered by the housing, and such that the downwardly disposed portion of the crank handle is located within a portion of the notched bottom of the housing between the locking bar and the closed end of the notch, and securing the locking bar in place adjacent the housing.

12. The method according to claim 10 comprising the additional step of passing a chain secured to the housing through at least two downwardly depending lock chain guide harnesses, then around the dolly-leg, and then to the locking bar where it is secured to the locking bar.

13. In combination, an anti-theft device comprising a dolly-leg crank handle of a semi-trailer, and a housing, said housing having a top, an end panel, a first side, a second side, a notched bottom, said first side and said second side each having formed therein a first side aperture and a second side aperture respectively, a locking bar, said locking bar having formed therein at one end thereof a locking bar aperture, and a lock, said lock being secured to said locking bar by attachment thereto through said locking bar aperture, said dolly-leg crank handle extending downwardly through a portion of said notched bottom.

14. The anti-theft device according to claim 13 wherein said locking bar extends through both said first side and said second side of said housing, said locking bar passing through both said first side aperture and said second side aperture.

15. The anti-theft device according to claim 14 wherein said locking bar is retained in said housing by the passing of said lock through said locking bar aperture.

* * * * *